United States Patent
Scotton et al.

(10) Patent No.: US 7,300,305 B2
(45) Date of Patent: Nov. 27, 2007

(54) CONNECTING ELEMENT FOR CONNECTING CELLS TO FORM ACCUMULATORS

(75) Inventors: Daniel Scotton, Visp (CH); Pascal Collaud, Visp (CH)

(73) Assignee: SAT Akkumulatoren Technik AG, Eyholz (CH)

( * ) Notice: Subject to any disclaimer, the term of this patent is extended or adjusted under 35 U.S.C. 154(b) by 22 days.

(21) Appl. No.: 11/352,430

(22) Filed: Feb. 10, 2006

(65) Prior Publication Data

US 2006/0193685 A1   Aug. 31, 2006

(30) Foreign Application Priority Data

Feb. 14, 2005   (CH) .................................. 00265/05

(51) Int. Cl.
*H01R 3/00*   (2006.01)
(52) U.S. Cl. ........................................ 439/500; 429/99
(58) Field of Classification Search ................ 439/500; 429/94, 96, 99, 100
See application file for complete search history.

(56) References Cited

U.S. PATENT DOCUMENTS

| | | | | |
|---|---|---|---|---|
| 4,633,239 A | * | 12/1986 | Nalbanti | 340/636.1 |
| 4,693,535 A | * | 9/1987 | Frode | 439/277 |
| 7,052,332 B2 | * | 5/2006 | Heller et al. | 439/766 |
| 7,198,508 B2 | * | 4/2007 | Ling et al. | 439/485 |
| 2006/0094289 A1 | * | 5/2006 | Kim et al. | 439/500 |

* cited by examiner

*Primary Examiner*—Khiem Nguyen
(74) *Attorney, Agent, or Firm*—SEED Intellectual Property Law Group PLLC

(57) ABSTRACT

A connecting element for connecting cells comprises a plate-shaped element (2) made up of conducting material, which element has at least two tabs opposite one another, which tabs each have a connecting area by means of which the respective tab is connectible in its end region (8) to the respective pole of the cell. The respective connecting area of each tab (4), (5), (6), and (7) of the plate-shaped element (2) comprises a bulge (9). This bulge (9) has a length corresponding to at least 1.5 times the width of the bulge (9). The tabs of the connecting element are connectible by means of resistance welding to the respective pole of the corresponding cell.

20 Claims, 3 Drawing Sheets

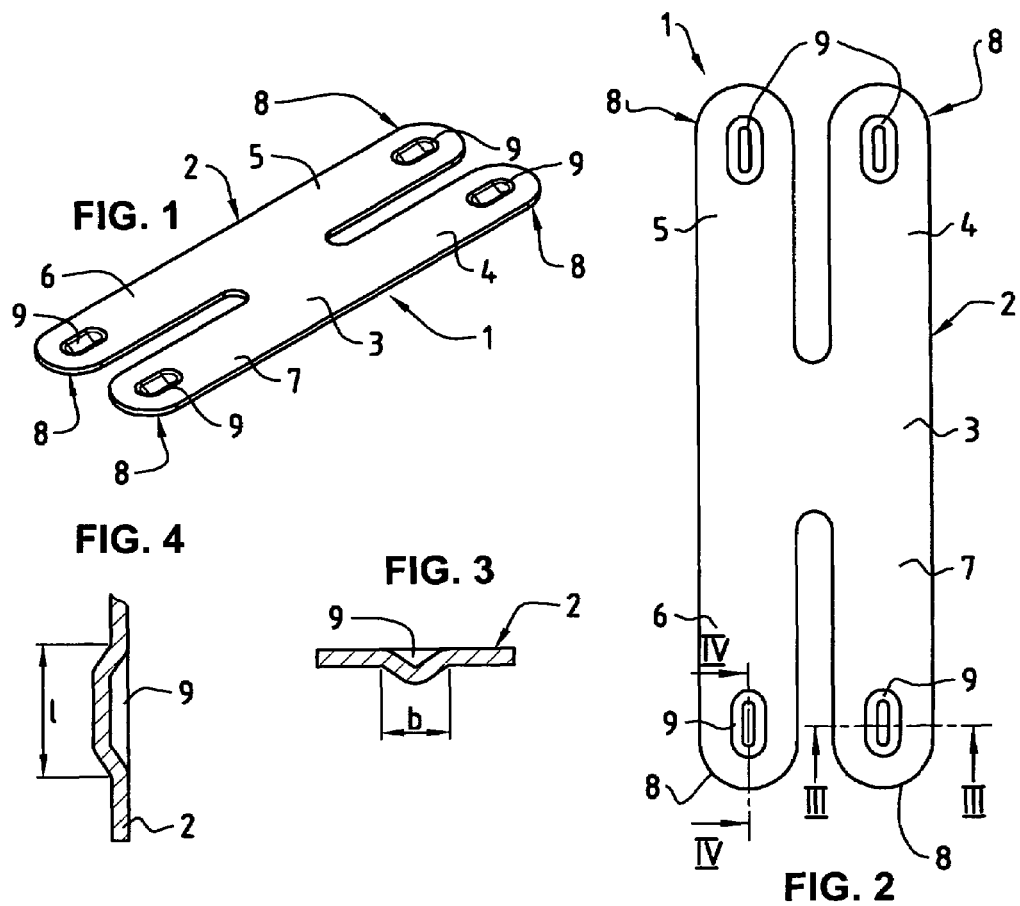
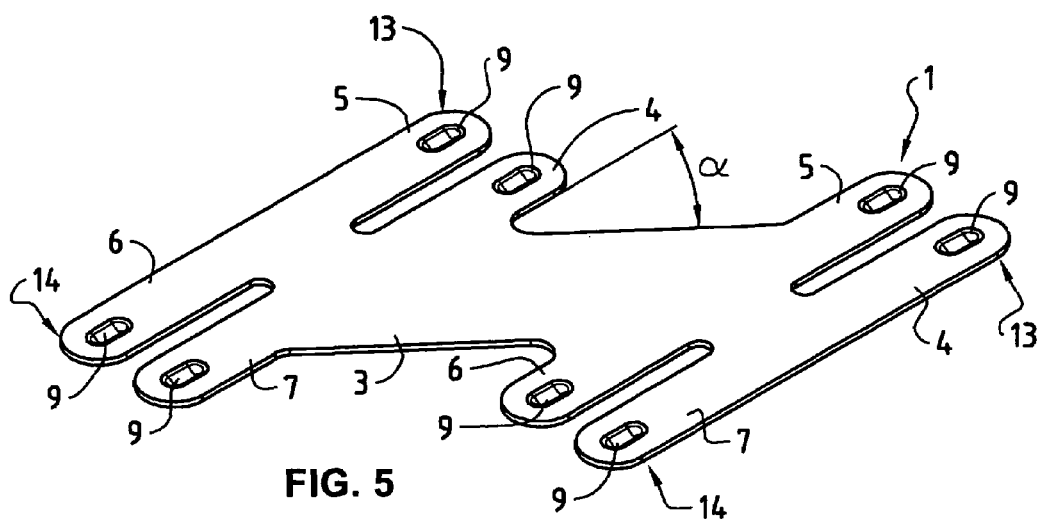

CONNECTING ELEMENT FOR CONNECTING CELLS TO FORM ACCUMULATORS

CROSS-REFERENCE TO RELATED APPLICATION

This application claims priority to Switzerland Patent Application No. 265/05, filed Feb. 14, 2005, which application is incorporated herein by reference in its entirety.

BACKGROUND OF THE INVENTION

1. Field of the Invention

The present invention relates to a connecting element for connecting cells to form accumulators, comprising a plate-shaped element composed of a conducting material, which element has at least two tabs disposed opposite one another, which tabs each have a connecting area by means of which the respective tab is connectible in its end region to the corresponding pole of the cell.

2. Description of the Related Art

Accumulators of this kind, made up of individual cells, are used in diverse applications. For these purposes, a plurality of cells are connected together, serially or in parallel, depending upon the application. To connect the individual cells, a connecting element is used on whose tabs in the end regions point-like elevations are provided. During resistance welding, these raised points serve as connecting points between the respective pole of the corresponding connectible cell and the connecting element. A punctiform weld results. Accumulators having the desired characteristics can thus be assembled from a plurality of cells.

As has already been mentioned, accumulators of this kind are used for diverse applications, including for battery-driven hand tools and implements, for instance. Thus these accumulators can also be subjected to severe mechanical strains and stresses. When used in percussion drilling machines, for instance, these accumulators are subjected to heavy vibrations.

With applications of this kind, it has been shown that the known punctiform connecting points described above have not always been able to meet the demands. Owing to the mechanical strain and stress, the connections can be destroyed, and the accumulator can no longer be used.

BRIEF SUMMARY OF THE INVENTION

The object of the present invention is therefore to design the connecting element in such a way that between the respective poles of the cells to be connected together a connection can be achieved that is able to withstand the higher mechanical strains and stresses without being damaged.

This object is achieved according to the invention in that the respective connecting area of each tab of the plate-shaped element comprises a bulge having a length corresponding to at least 1.5 times the width of the bulge, via which the tabs of the connecting element are connectible by resistance welding to the respective pole of the corresponding cell.

With places of connection of this kind, a very strong connection is obtained between the connecting element and the respective pole of the cell, which connection can withstand heavy vibrations even long-term. The quality of the corresponding accumulator is thereby greatly enhanced.

The bulge of each tab is preferably provided in the middle, and has a width corresponding to a third of the tab width. By means of these features, the tab is not weakened when making the bulge, which has a positive result for the connection to the respective cell.

The length of each bulge of a tab is preferably twice as large as the width of the tab, whereby an optimal stability is achieved for both the tab and the connection to the corresponding pole of the cell.

The connecting element is preferably made of a cold rolled strip, nickel plated electrolytically, preferably by punching out, whereby a very simple and inexpensive mode of manufacture results.

Another preferred embodiment of the invention consists in the bulge being achievable through stamping. This stamping procedure can be integrated into the punching out step. The stamping procedure can also be carried out following the punching out, however.

The connecting element is preferably provided with two tabs, in each case disposed parallel to one another and running parallel to one another. A very much better stability of the connecting areas results therefrom.

Another preferred embodiment of the invention consists in that these connecting elements have a central part at each of the ends of which two pairs of tabs are provided, one pair of tabs being disposed in each case parallel and opposite the other pair. In this way two cells each are able to be connected in parallel in an optimal way.

Another preferred embodiment of the invention consists in each of the two pairs of tabs being inclined with respect to the central part, preferably by about 42°, whereby the cells connected together in this way are able to be connected in as tight a configuration as possible, space requirements being thereby kept at a minimum.

BRIEF DESCRIPTION OF THE SEVERAL VIEWS OF THE DRAWINGS

Embodiments of the invention will be described in more detail in the following, by way of example, with reference to the attached drawing:

FIG. 1 shows, in a spatial representation, a first embodiment of a connecting element according to the invention;

FIG. 2 is a view from above of the connecting element according to FIG. 1;

FIG. 3 is a sectional view through the connecting element according to FIG. 2 along the line III-III;

FIG. 4 is a sectional view through the connecting element according to FIG. 2 along the line IV-IV;

FIG. 5 shows, in a spatial representation, a further embodiment of the connecting element according to the invention;

DETAILED DESCRIPTION OF THE INVENTION

Figure 6:
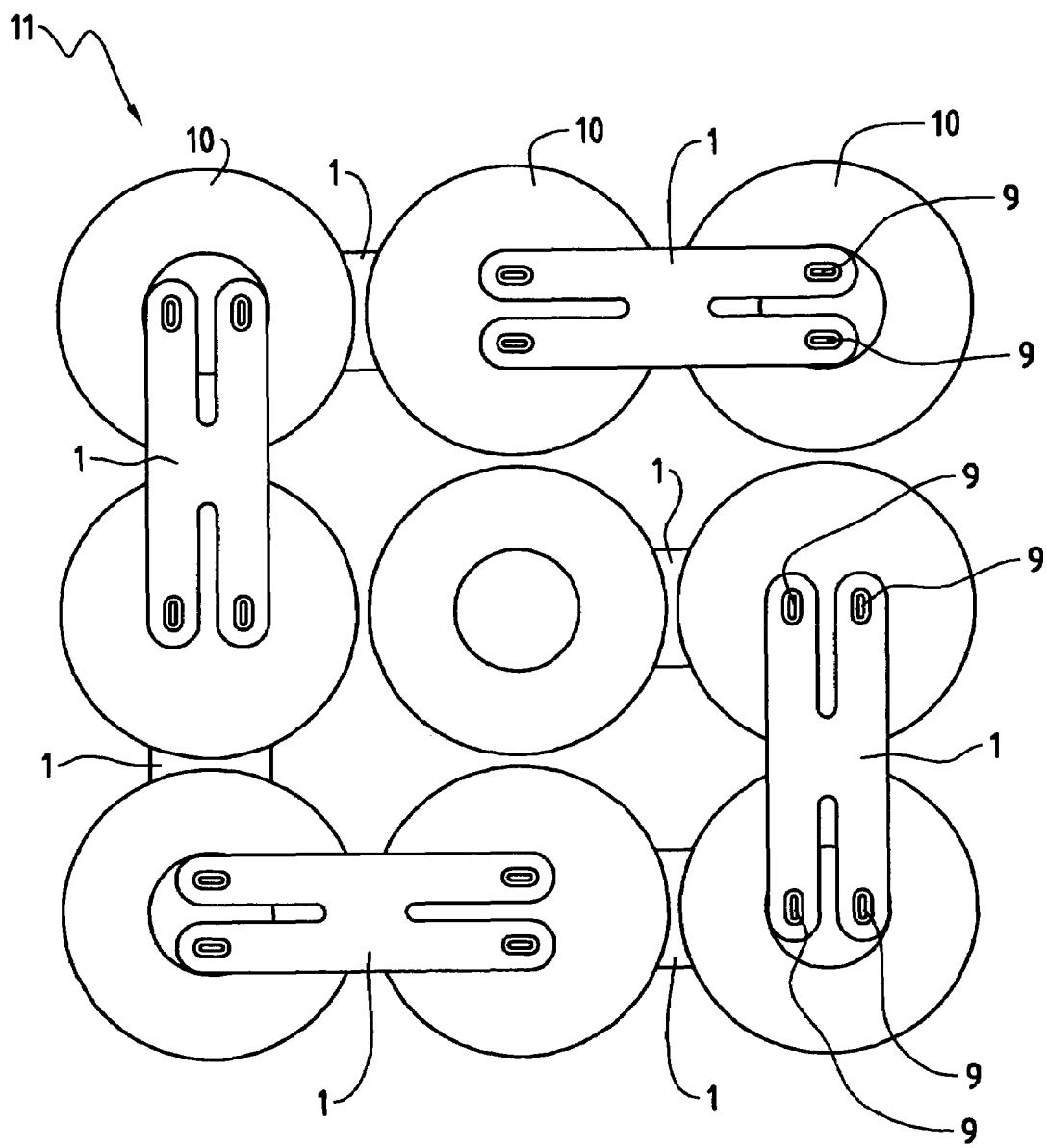
FIG. 6 is a view from above of a number of cells connected in series, forming an accumulator, with the first embodiment of the connecting element according to the invention.

A first embodiment of the connecting element 1 according to the invention can be seen in FIGS. 1 and 2. This connecting element 1 consists of a plate-shaped element 2, provided with a central part 3 on which tabs 4, 5, 6 and 7 are disposed. Two tabs each, 4 and 5 or 6 and 7, are aligned parallel to one another, and are disposed in each case opposite the other tabs.

Each of the tabs 4, 5, 6 and 7 is provided with a bulge 9 in the respective end region 8, which bulge will be described in detail later.

The embodiment example shown here is composed of an electrolytically nickel-plated cold rolled strip (for example Hilumin®); the manufacturing can take place through punching out. The cold rolled strip has a thickness of about 0.3 mm; the entire length of the connecting element is about 25 mm, the width about 8 mm. The width of the tabs 4, 5, 6 and 7 is about 3.4 mm; the spacing between the two tabs, disposed next to each other, thus amounts to about 1.2 mm.

As can be seen from FIGS. 3 and 4, each bulge 9 has a width b, which in the present example measures about 1.2 mm. The length l of this bulge amounts to about 2.4 mm; thus the length of this bulge in this example is twice the width. The depth of this bulge 9 measures about 0.3 mm. These bulges in the connecting element 1 shown here can be achieved through stamping, for example.

The connecting element 1 shown in FIGS. 1 and 2 is used for connecting cells 10 to form an accumulator 11, as can be seen from FIG. 6. The cells 10 shown here are connected in series. This means that a positive pole of a cell is always connected to a negative pole of the adjacent cell via one connecting element 1 each. The attachment of the connecting element 1 to the respective poles of the cells 10 takes place by resistance welding. For this purpose, the respective connecting element 1 is placed on the cell with the bulges 9 facing the respective pole, and the connecting element is connected to the corresponding pole of the respective cell 10 by resistance welding. By means of the design of the bulge 9, as has been described with reference to FIGS. 3 and 4, two welding surfaces per pole are obtained that correspond approximately to the overall dimensions of the respective bulge 9. These welding surfaces are thereby large enough that they are able to withstand diverse mechanical strains and stresses to which an accumulator of this kind can be exposed. The accumulator 11 thus produced with connecting elements 1 is thereby given a correspondingly long life.

FIG. 5 shows another embodiment example of a connecting element 1 according to the invention. In the description of this further embodiment example, the same reference numerals have been used for the same elements as in the first embodiment example. This connecting element 1 likewise has a central part 3, at each of whose ends 12 two pairs 13 and 14 of tabs 4, 5, 6 and 7 are disposed. One pair 13 each of tabs 5, 6, 7 and 8 is disposed parallel to and opposite the other pair 14 of tabs 5, 6, 7 and 8. Each of these tabs 4, 5, 6 and 7 is provided with one bulge 9 each, corresponding to the first embodiment example. The tab pairs 13 and 14 are each inclined with respect to the central part 3 of the connecting element by an angle a of the order of magnitude of about 42°. This further embodiment example of a connecting element 1 is also produced from an electrolytically nickel-plated cold rolled strip, preferably by punching out. The overall length of the tab here is once again about 25 mm, and the overall width of this connecting element 1 likewise measures about 25 mm. The dimensions of the tabs 4, 5, 6 and 7 correspond to the dimensions of the tabs 4, 5, 6 and 7 of the first embodiment example. The bulges 9 also have the same dimensions as in the first embodiment example.

Figure 7:
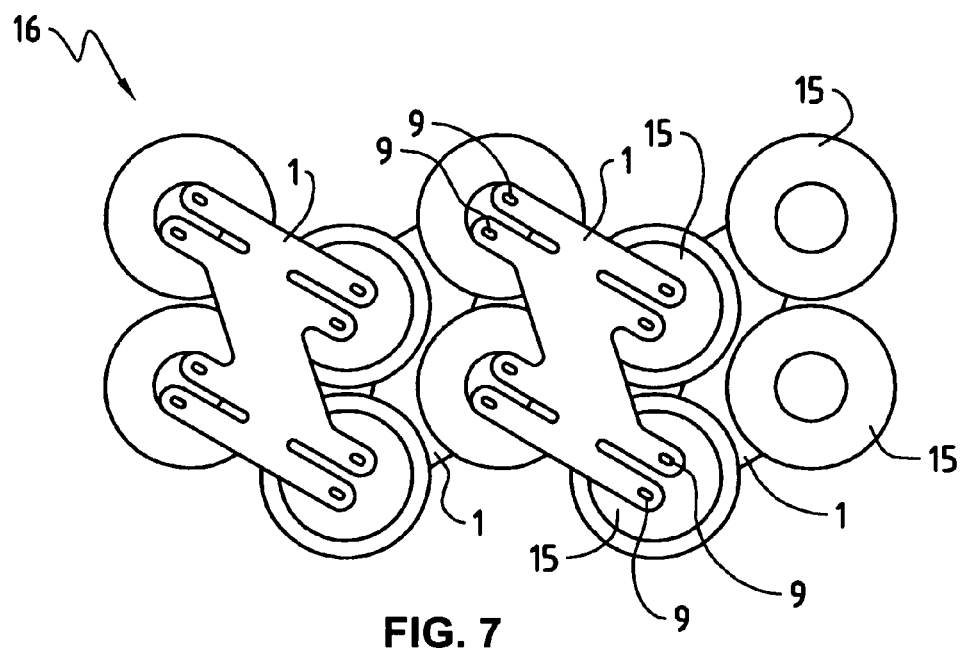
FIG. 7 is a view from above of cells, parallel and connected together in series, forming an accumulator, with the second embodiment of the connecting element according to the invention.
Figure 8:
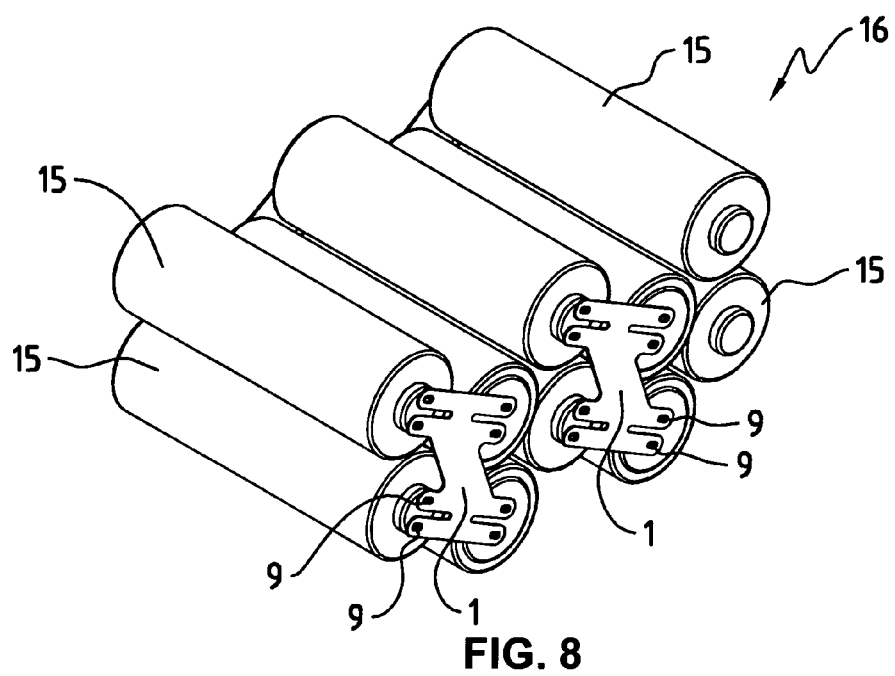
FIG. 8 is a spatial representation of the cells connected together according to FIG. 7.

As can be seen from FIGS. 6 and 7, connecting elements 1 of this kind are also used for connecting cells 15 to form an accumulator 16. Here two cells in each case are connected in parallel; the respective cells, connected in parallel, are then serially connected. Through the design of these connecting elements 1, the cells 15 are each aligned offset with respect to one another. A very compact package of cells 15 is thereby obtained; the space requirements for an accumulator 16 of this kind is minimal.

Here too, for connection of these cells 15, the connecting elements are placed on the respective poles of the cells 15 such that the bulges 9 are directed facing the cells 15. Through resistance welding, a connection having a large area is obtained here as well, corresponding approximately to the dimensions of the bulges 9. Also achieved here is a connection of the individual cells to one another that can be subjected to very powerful mechanical stresses and strains without the places of connection being destroyed. Connecting elements of this kind will preferably be used to connect secondary cells which are rechargeable, to form accumulators. It is hereby ensured that these rechargeable accumulators have a long life, also in particular with relation to mechanical stresses and strains to which the places of connection are subjected. Of course connecting elements of this kind can also be used, however, for connection of primary cells (not rechargeable) to form batteries.

Especially in the case of tensile stresses and strains put on the connecting areas, it has been shown that significantly higher traction forces could be absorbed with these embodiments under consideration than in the case of connecting elements of the state of the art.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A connecting element for connecting cells to form accumulators, comprising a plate-shaped element made up of conducting material, which element has at least two tabs, opposite one another, which tabs each have a connecting area by means of which the respective tab is connectible in its end region to the corresponding pole of the cell, wherein the respective connecting area of each tab of the plate-shaped element comprises a bulge having a length corresponding to at least 1.5 times the width of the bulge via which the tabs of the connecting element are connectible by means of resistance welding to the respective pole of the corresponding cell.

2. The connecting element according to claim 1, wherein the bulge of each tab is provided in the middle, and has a width corresponding to about one third of the tab width.

3. The connecting element according to claim 1, wherein the length of each bulge of a tab is twice as large as the width of the tab.

4. The connecting element according to claim 1, wherein this connecting element is able to be manufactured from an electrolytically nickel-plated cold rolled strip, preferably by punching out.

5. The connecting element according to claim 1, wherein the bulge is achievable by stamping.

6. The connecting element according to claim 2 wherein the length of each bulge of a tab is twice as large as the width of the tab.

7. The connecting element according to claim 2, wherein this connecting element is able to be manufactured from an electrolytically nickel-plated cold rolled strip, preferably by punching out.

8. The connecting element according to claim 3, wherein this connecting element is able to be manufactured from an electrolytically nickel-plated cold rolled strip, preferably by punching out.

9. The connecting element according to claim 6, wherein this connecting element is able to be manufactured from an electrolytically nickel-plated cold rolled strip, preferably by punching out.

10. The connecting element according to claim 2, wherein the bulge is achievable by stamping.

11. The connecting element according to claim 3, wherein the bulge is achievable by stamping.

12. The connecting element according to claim 4, wherein the bulge is achievable by stamping.

13. The connecting element according to claim 6, wherein the bulge is achievable by stamping.

14. The connecting element according to claim 7, wherein the bulge is achievable by stamping.

15. The connecting element according to claim 8, wherein the bulge is achievable by stamping.

16. The connecting element according to claim 9, wherein the bulge is achievable by stamping.

17. The connecting element according to any one of claims 1 to 5 and 6 to 16, wherein this connecting element is provided with two tabs in each case disposed parallel to one another and running parallel to one another.

18. The connecting element according to any one of claims 1 to 5 and 6 to 16, wherein this connecting element has a central part on each of whose ends two pairs of tabs are provided, one pair of tabs in each case being disposed parallel and opposite the other pair.

19. The connecting element according to claim 13, wherein each of the two pairs of tabs is inclined with respect to the central part by an angle.

20. The connecting element according to claim 19, wherein the angle, by which each of the two pairs of tabs are inclined with respect to the central part is about 35° to 50°, preferably about 42°.

* * * * *

UNITED STATES PATENT AND TRADEMARK OFFICE
CERTIFICATE OF CORRECTION

PATENT NO.       : 7,300,305 B2                                            Page 1 of 1
APPLICATION NO.  : 11/352430
DATED            : November 27, 2007
INVENTOR(S)      : Daniel Scotton et al.

It is certified that error appears in the above-identified patent and that said Letters Patent is hereby corrected as shown below:

Cover Page
Item (73) Assignee address, "Eyholz (CH)" should read as -- Eyeholz (CH) --

Column 6
Line 18, "13" should read as -- 18 --

Signed and Sealed this

Twenty-eighth Day of October, 2008

JON W. DUDAS
*Director of the United States Patent and Trademark Office*